US007523652B2

(12) United States Patent
Baker et al.

(10) Patent No.: US 7,523,652 B2
(45) Date of Patent: Apr. 28, 2009

(54) ELECTRIC FUEL PUMP TESTING METHOD AND APPARATUS

(75) Inventors: Mark A. Baker, O'Fallon, MO (US); James M. Merlotti, Fenton, MO (US)

(73) Assignee: Federal Mogul World Wide, Inc., Southfield, MI (US)

( * ) Notice: Subject to any disclaimer, the term of this patent is extended or adjusted under 35 U.S.C. 154(b) by 65 days.

(21) Appl. No.: 11/560,618

(22) Filed: Nov. 16, 2006

(65) Prior Publication Data

US 2008/0148832 A1 Jun. 26, 2008

(51) Int. Cl.
*G01M 15/04* (2006.01)

(52) U.S. Cl. .................................................. 73/114.41

(58) Field of Classification Search .............. 73/114.38, 73/114.41, 114.42, 114.43
See application file for complete search history.

(56) References Cited

U.S. PATENT DOCUMENTS 2,073,243 A 3/1937 Liddell et al.
3,245,254 A 4/1966 Mayer
3,292,428 A 12/1966 Motl
3,340,728 A 9/1967 Taylor et al.
3,374,667 A 3/1968 Mayer
3,577,776 A * 5/1971 Brown, Jr. ............... 73/114.41
3,745,818 A 7/1973 Gaenzler
3,831,440 A 8/1974 Monnet
4,206,634 A 6/1980 Taylor et al.
4,333,338 A * 6/1982 Patey et al. .............. 73/114.41
4,459,846 A 7/1984 Harrington
5,499,538 A * 3/1996 Glidewell et al. ........ 73/114.41
5,633,457 A * 5/1997 Kilar et al. ............... 73/114.45
5,770,796 A * 6/1998 Sakamoto et al. ........ 73/114.41
6,321,593 B1 11/2001 Rich
6,907,775 B2 * 6/2005 Hosoya ................... 73/114.41
7,127,940 B2 * 10/2006 Shin et al. ................ 73/114.75
7,127,941 B2 * 10/2006 Shin ........................ 73/114.36
2002/0029641 A1 * 3/2002 Larsson ....................... 73/861
2004/0112126 A1 * 6/2004 Hosoya ..................... 73/118.1

* cited by examiner

*Primary Examiner*—Eric S McCall
(74) *Attorney, Agent, or Firm*—Robert L. Stearns; Dickinson Wright PLLC

(57) ABSTRACT

A system and method for testing the operation of fuel pump is disclosed. The apparatus includes a pressure measurement portion, a flow measurement portion, an electrical diagnostic portion, and a fault simulation portion, where a user can simulate a number of potential fuel system failures to determine the diagnostics of the fuel system. The method includes the steps of measuring an electrical value related to the fuel pump, measuring a pressure related to the fuel pump, measuring a fuel flow related to the fuel pump, simulating a fuel system failure condition, and determining an operating status of the fuel pump.

3 Claims, 2 Drawing Sheets

ELECTRIC FUEL PUMP TESTING METHOD AND APPARATUS

RELATED APPLICATIONS

NONE.

STATEMENT REGARDING FEDERALLY SPONSORED RESEARCH

NONE

TECHNICAL FIELD

This invention relates generally to a method and apparatus for testing the operation of electric fuel pumps and, more particularly, to an improved portable apparatus for testing the operation of electric fuel pumps in an uninstalled condition with which various faulty operating modes can be simulated in order to confirm the proper operation of an installed electric fuel pump.

BACKGROUND OF THE INVENTION

There are a number of known systems and methods for testing the operation of fuel pumps, generally, and more particularly automotive fuel pumps. For example, U.S. Pat. No. 2,073,243 discloses a portable instrument for testing the operation of a fuel system and includes a flow meter. U.S. Pat. No. 3,292,428 similarly discloses an automotive fuel pump testing apparatus. The apparatus of this patent is designed to test the operation of a fuel pump that is installed in, and being powered by, the automobile.

The methods and systems for testing a fuel pump in the prior art suffer from a number of limitations. These limitations include: (1) a limited number of testing factors such that only limited causes of failure of the fuel system can be tested, and (2) the inability to determine the root cause of the fuel system issues. A system and method that overcomes these, and other, limitations of the prior art would be desirable.

SUMMARY OF THE INVENTION

In general terms, this invention provides a system and method for testing the operation of an electric fuel pump. The fuel pump test apparatus of the present invention comprises a pressure measurement portion for measuring the operating pressure of the fuel pump. The apparatus further includes a flow measurement portion for measuring the flow exiting from the fuel pump. An electrical diagnostic portion is also included in the test apparatus to measure and display the electrical operating conditions of the fuel pump. The apparatus further includes a fault simulation portion, wherein the fault simulation portion allows a user to simulate a number of potential fuel system failures to determine the operation of the fuel pump.

The method of the present invention comprises measuring an electrical value related to the fuel pump, measuring a pressure related to the fuel pump, measuring a fuel flow related to the fuel pump, simulating a fuel system failure condition, and determining an operating status of the fuel pump.

These and other features and advantages of this invention will become more apparent to those skilled in the art from the detailed description of a preferred embodiment. The drawings that accompany the detailed description are described below.

DETAILED DESCRIPTION

Figure 1:
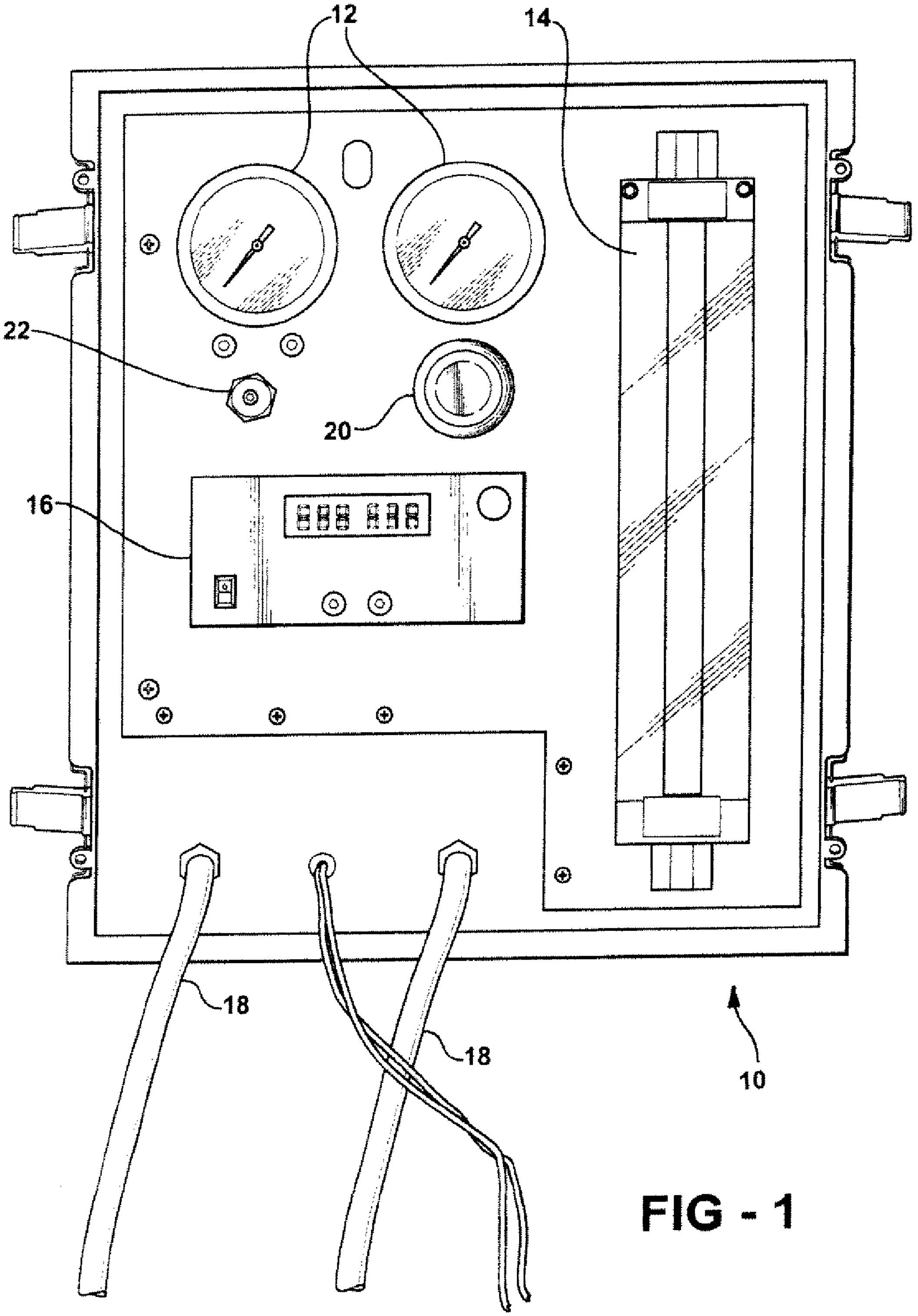
FIG. 1 is a front view of a portable fuel pump test apparatus according to one embodiment of the present invention.

FIG. 1 illustrates a portable fuel pump test apparatus 10 according to one embodiment of the present invention. The apparatus 10 includes a pressure measurement portion. The pressure measurement portion may include, for example, two pressure gauges 12 that allow for measuring the pressure of the flow exiting the fuel pump before and after an adjustable needle valve, as described more fully below. The apparatus 10 further includes a flow measurement portion. The flow measurement portion may include, for example, a calibrated variable area flowmeter 14 that determines the flow of fuel from the fuel pump. Additionally, the apparatus 10 includes an electrical diagnostic portion. In the illustrated example of FIG. 1, the electrical diagnostic portion comprises a variable power supply 16. The variable power supply 16 is connected to the fuel pump to be tested and, as discussed more fully below, includes an ammeter and voltmeter such that operating voltage and current draw of the fuel pump may be monitored. The apparatus 10 also includes a fault simulation portion. The fault simulation portion allows the user of the test apparatus 10 to simulate a number of different fuel system failures that may be used to more accurately diagnose the specific failure of the fuel system. In the illustrated example, the fault simulation portion includes variable power supply 16, adjustable pressure relief valve 20 and adjustable restriction valve 22. The operation of each of these portions is described more fully below.

Figure 2:
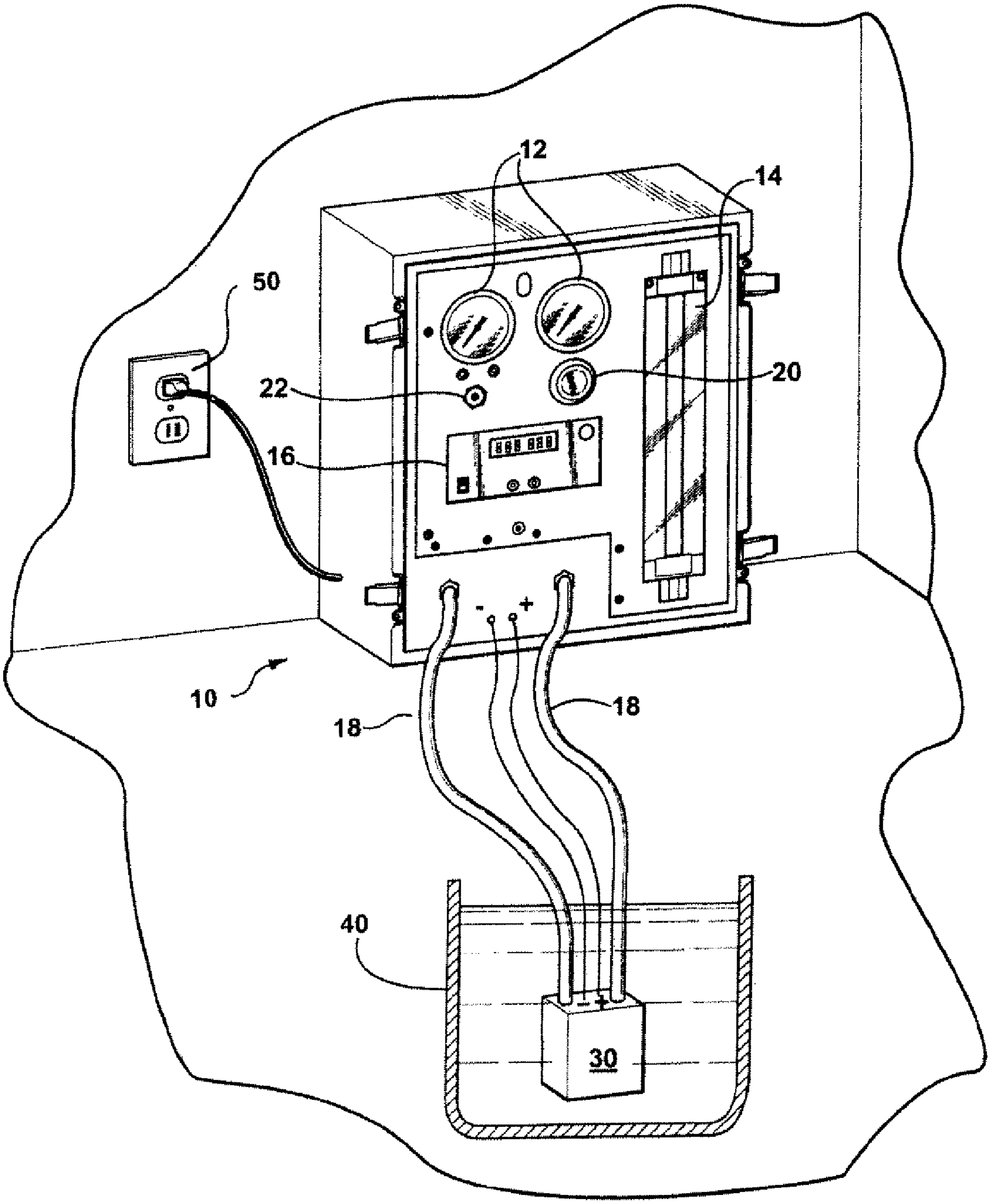
FIG. 2 is a schematic view of a portable fuel pump test apparatus according to one embodiment of the present invention that is connected to a fuel pump to be tested.

The apparatus 10 of the present invention may be used in the following manner. As shown in FIG. 2, the apparatus 10 is connected to a fuel pump 30 via fluid hoses 18, one each for travel to and from the fuel pump 30. The fuel pump 30 is optionally immersed in a fuel substitute, e.g., mineral spirits, present in container 40. The container 40 operates as a reservoir for the fuel substitute, similar to how a fuel tank would operate in an automobile environment. In an alternative embodiment, fuel may be used instead of fuel substitute. The hoses 18 may include quick disconnect features, as is well known in the art, to make connection to the fuel pump 30 and apparatus 10 easier. The adjustable pressure relief valve 20 and adjustable restriction valve 22 are arranged such that the fuel substitute travels from fuel pump 30 through the adjustable restriction valve 22, then through the flowmeter 14 and the adjustable pressure release valve 20 and returns to container 40. The apparatus 10 may further include an in-line filter located at the output of the fuel pump. The in-line filter prevents damage to the apparatus 10 by filtering out any contaminants from the fuel pump 30 being tested. Two separate pressure gauges 12 may be located within the apparatus, one located immediately after the in-line filter and before the adjustable restriction valve 22 and the other immediately after the adjustable restriction valve 22. The second pressure gauge 12 is optionally the adjustable pressure relief valve 20 described above. The apparatus 10 is also connected electrically to the fuel pump 30 so that the apparatus 10 can provide and regulate power to the fuel pump 30. Once arranged, the apparatus 10 is plugged into a standard 120 Volt outlet 50, although any form of power may be utilized with this invention (e.g., battery). The apparatus 10 may then be turned on, and testing of the fuel pump 30 may begin.

The apparatus 10 provides power to, and monitors the operating characteristics of, the fuel pump 30. The pressure measurement portion (e.g., illustrated pressure gauges 12) displays the operating pressure of the fuel pump at two different points of the system, one before, and one after, the adjustable restriction valve 22. The flow measurement portion (e.g., calibrated variable area flowmeter 14) displays the rate of fuel flow from the fuel pump 30. The electrical diagnostic portion (e.g., variable power supply 16) may include an ammeter and voltmeter for monitoring the operating voltage and current draw of the fuel pump 30, which can then by displayed to the user. Each of the operating conditions described above may be compared to design specifications (either by the user or by the apparatus itself) of the fuel pump 30 to determine whether the fuel pump is operating properly.

If the fuel pump 30 is determined to be operating according to its design specifications, the user may then use the fault simulation portion to test for other potential fuel system problems, and thereby determine the operation of the fuel pump 30 if such fuel system problem exists. One such potential fuel system problem is a vehicle voltage supply problem. This problem can be simulated by the user by adjusting the adjustable power supply 16 to provide a lower than specified operating voltage to the fuel pump 30. Alternatively, the adjustable restriction valve 22 may be adjusted to restrict the flow of the fuel substitute, thereby simulating a fuel filter obstruction or restriction. The adjustable pressure relief valve 20 may also be adjusted to simulate fuel system pressure problems. During a fuel system problem simulation, the apparatus 10 determines the output pressure both before and after the adjustable restriction valve 22, the flow rate and current draw of the fuel pump 30 to determine whether it is operating properly.

Among the many benefits of the present invention is the ability to test fuel pumps uninstalled in a vehicle. The apparatus of the present invention provides a user with the ability to quickly connect and disconnect the fuel pump to be tested to the apparatus, for example, by quick disconnect hoses 18 described above. Additionally, and in stark contrast to the fuel pump testing systems and methods of the prior art, the apparatus of the present invention powers the fuel pump to be tested such that the vehicle may be inoperative. Thus, the present invention may be used with fuel substitute, which is safer than using actual fuel, and in enclosed spaces due to the fact that no toxic exhaust is emitted. Other benefits of the present invention will be readily apparent to those skilled in the art.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A fuel pump test apparatus, comprising:

a pressure measurement portion connectable to the fuel pump to measure pressure of fluid flow from the fuel pump, a flow measurement portion adjacent the pressure measurement portion and connectable to the fuel pump to measure fluid flow from the fuel pump, an electrical diagnostic portion adjacent the flow measurement portion and connectable to the fuel pump and to monitor current draw and operating voltage of the fuel pump, and a fault simulation portion adjacent the pressure measurement portion, wherein the fault simulation portion allows a user to simulate potential fuel system failures to determine the operation of the fuel pump;

wherein said fault simulation portion comprises an adjustable needle valve, said adjustable needle valve being capable of simulating a flow obstruction of a fuel pump by restricting an output of said fuel pump.

2. A fuel pump test apparatus, comprising:

a pressure measurement portion connectable to the fuel pump to measure pressure of fluid flow from the fuel pump, the pressure measurement portion comprising at least one pressure gauge, a flow measurement portion adjacent the pressure measurement portion and connectable to the fuel pump to measure fluid flow from the fuel pump, an electrical diagnostic portion adjacent the flow measurement portion and connectable to the fuel pump and to monitor current draw and operating voltage of the fuel pump, and a fault simulation portion adjacent the pressure measurement portion, wherein the fault simulation portion allows a user to simulate potential fuel system failures to determine the operation of the fuel pump;

wherein said flow measurement portion comprises at least one flow gauge, said electrical diagnostic portion comprises a measurement device for voltage and a measurement device for current, and said fault simulation portion comprises:

an adjustable needle valve, said adjustable needle valve being capable of simulating a flow obstruction of a fuel pump by restricting an output of said fuel pump, and an adjustable power supply, said adjustable power supply being capable of simulating a power supply issue of a fuel pump by adjusting an input power of said fuel pump.

3. A fuel pump test apparatus, comprising:

a pressure measurement portion connectable to the fuel pump to measure pressure of fluid flow from the fuel pump, a flow measurement portion adjacent the pressure measurement portion and connectable to the fuel pump to measure fluid flow from the fuel pump, an electrical diagnostic portion adjacent the flow measurement portion and connectable to the fuel pump and to monitor current draw and operating voltage of the fuel pump, and a fault simulation portion adjacent the pressure measurement portion, wherein the fault simulation portion allows a user to simulate potential fuel system failures to determine the operation of the fuel pump, the fault simulation portion comprising:

an adjustable needle valve, said adjustable needle valve being capable of simulating a flow obstruction of a fuel pump by restricting an output of said fuel pump, and an adjustable power supply, said adjustable power supply being capable of simulating a power supply issue of a fuel pump by adjusting an input power of said fuel pump.

* * * * *